US012669939B2

(12) United States Patent (10) Patent No.: US 12,669,939 B2
Tai et al. (45) Date of Patent: Jun. 30, 2026

(54) ADAPTIVE SUPER BLOCK WEAR LEVELING

(71) Applicant: Micron Technology, Inc., Boise, ID (US)

(72) Inventors: Ying Yu Tai, Mountain View, CA (US); Seungjune Jeon, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/958,210

(22) Filed: Sep. 30, 2022

(65) Prior Publication Data

US 2024/0111431 A1 Apr. 4, 2024

(51) Int. Cl.
*G06F 3/06* (2006.01)
(52) U.S. Cl.
CPC ............ *G06F 3/0616* (2013.01); *G06F 3/064* (2013.01); *G06F 3/0652* (2013.01); *G06F 3/0679* (2013.01)
(58) Field of Classification Search
CPC ... G11C 16/3495; G11C 16/16; G11C 29/028; G06F 3/0616; G06F 3/064; G06F 3/0652; G06F 3/0679
See application file for complete search history.

(56) References Cited

U.S. PATENT DOCUMENTS

| | | | |
|---|---|---|---|
| 9,329,797 B2 | 5/2016 | Darragh et al. | |
| 9,442,662 B2 | 9/2016 | Dancho et al. | |
| 9,710,376 B2 | 7/2017 | Baltar | |
| 10,275,310 B2 | 4/2019 | B et al. | |
| 10,282,111 B2 | 5/2019 | Barndt et al. | |
| 10,324,648 B1 | 6/2019 | Goss et al. | |
| 2015/0213893 A1 | 7/2015 | Parker et al. | |
| 2017/0123726 A1* | 5/2017 | Sinclair | G06F 12/02 |
| 2018/0267705 A1 | 9/2018 | Liu et al. | |
| 2019/0391752 A1 | 12/2019 | Pletka et al. | |
| 2023/0307061 A1* | 9/2023 | Konishi | G11C 16/3495 |

OTHER PUBLICATIONS

Chen F H., et al., "PWL: A Progressive Wear Leveling to Minimize Data Migration Overheads for Nand Flash Devices," Design, Automation Test in Europe Conference Exhibition (DATE), Grenoble, France, 2015, pp. 1209-1212.

(Continued)

*Primary Examiner* — Ernest Unelus
(74) *Attorney, Agent, or Firm* — Lowenstein Sandler LLP

(57) ABSTRACT

A system can include a memory device a memory device comprising multiple dies, and a processing device, operatively coupled with the memory device, to perform various operations including identifying multiple management units to be programmed, where one management unit contains memory cells from a die having one endurance metric and another management unit contains memory cells from a die having another endurance metric, and determining a value of a media endurance metric for each management unit. The operations further include determining, for each management unit, a respective endurance exhaustion parameter defined by a relationship media endurance metrics, and distributing operations to each management unit based on the endurance exhaustion parameter.

20 Claims, 6 Drawing Sheets

(56) References Cited

OTHER PUBLICATIONS

Liao J., et al., "Adaptive Wear-Leveling in Flash-Based Memory,"
IEEE Computer Architecture Letters, 2015, vol. 14 (1), pp. 1-4.
Yang M C., et al., "Reducing Data Migration Overheads of Flash
Wear Leveling in a Progressive Way," IEEE Transactions on Very
Large Scale Integration (VLSI) Systems, May 2016, vol. 24(5), pp.
1808-1820.

* cited by examiner

400

IDENTIFYING A PLURALITY OF MANAGEMENT UNITS TO BE PROGRAMMED, WHEREIN A FIRST MANAGEMENT UNIT COMPRISES A FIRST PLURALITY OF MEMORY CELLS RESIDING ON A FIRST DIE  EXHIBITING A FIRST VALUE OF A MEDIA ENDURANCE METRIC AND A SECOND MANAGEMENT UNIT COMPRISES A SECOND PLURALITY OF MEMORY CELLS RESIDING  ON A SECOND DIE EXHIBITING A SECOND VALUE OF THE MEDIA ENDURANCE METRIC 402

DETERMINING A RESPECTIVE VALUE OF A MEDIA ENDURANCE METRIC FOR EACH MANAGEMENT UNIT 406

DETERMINING, FOR EACH MANAGEMENT UNIT, A RESPECTIVE PARAMETER DEFINED BY A RELATIONSHIP BETWEEN THE VALUE OF THE MEDIA ENDURANCE METRIC OF THE DIE ON WHICH THE PLURALITY OF MEMORY CELLS OF THE MANAGEMENT UNIT RESIDE AND AN AGGREGATED VALUE OF THE MEDIA ENDURANCE METRIC OF ONE OR MORE DIES IN THE PLURALITY OF DIES 410

DETERMINING, FOR EACH MANAGEMENT UNIT, A RATIO OF A TOTAL NUMBER OF MEMORY ACCESS OPERATIONS TO BE PERFORMED BASED ON THE RESPECTIVE PARAMETER AND THE RESPECTIVE VALUE OF THE MEDIA ENDURANCE METRIC 414

DISTRIBUTING OPERATIONS TO EACH MANAGEMENT UNIT BASED ON THE PARAMETER 418

FIG. 4

500

IDENTIFYING A PLURALITY OF SUPER BLOCKS TO BE PROGRAMMED, WHEREIN EACH BLOCK WITHIN A FIRST SUPER BLOCK RESIDING ON A FIRST DIE EXHIBITING A FIRST MEDIA ENDURANCE RATING AND EACH BLOCK WITHIN A SECOND SUPER BLOCK RESIDING ON A SECOND DIE EXHIBITING A SECOND MEDIA ENDURANCE RATING, EACH OF THE FIRST MEDIA ENDURANCE RATING AND THE SECOND MEDIA ENDURANCE RATING INDICATING A RESPECTIVE NUMBER OF MEMORY ACCESS OPERATIONS (E.G., PROGRAM ERASE OPERATION CYCLES) 502

DETERMINING A RESPECTIVE VALUE OF A MEDIA ENDURANCE METRIC FOR EACH SUPER BLOCK 506

> DETERMINING A RESPECTIVE COUNT (E.G., NORMALIZED COUNT) OF MEMORY ACCESS OPERATIONS FOR EACH SUPER BLOCK 507

DETERMINING, FOR EACH SUPER BLOCK, A RESPECTIVE PARAMETER DEFINED BY A RELATIONSHIP BETWEEN THE VALUE OF THE MEDIA ENDURANCE METRIC OF THE DIE ON WHICH THE BLOCKS OF THE SUPERBLCOK RESIDE AND AN AGGREGATED VALUE OF THE MEDIA ENDURANCE METRIC OF THE ONE OR MORE DIES 510

DETERMINING, FOR EACH SUPER BLOCK, A RATIO OF A TOTAL NUMBER OF MEMORY ACCESS OPERATIONS TO BE PERFORMED BASED ON THE RESPECTIVE PARAMETER AND THE RESPECTIVE VALUE OF THE MEDIA ENDURANCE METRIC 514

DISTRIBUTING OPERATIONS TO EACH SUPER BLOCK BASED ON THE PARAMETER 518

> MAINTAINING A MAXIMUM PROGRAM-ERASE COUNT GAP BETWEEN A COUNT OF PROGRAM ERASE OPERATION CYCLES PERFORMED ON THE FIRST SUPER BLOCK AND THE COUNT OF PROGRAM ERASE OPERATION CYCLES PERFORMED ON THE SECOND SUPER BLOCK 519

> MAPPINGLOGICAL BLOCK ADDRESSES WITH DATA THAT IS MODIFIED MORE FREQUENTLY TO THE HIGH ENDURANCE SUPER BLOCKS AND MAP LOGICAL BLOCK ADDRESSES WITH DATA THAT IS UPDATED LESS FREQUENTLY TO THE LOW ENDURANCE SUPER BLOCKS 520

FIG. 5

ADAPTIVE SUPER BLOCK WEAR LEVELING

TECHNICAL FIELD

Embodiments of the disclosure relate generally to memory sub-systems, and more specifically, relate to adaptive wear leveling on memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a flow diagram of an example method for adaptive wear leveling in memory devices in accordance with some embodiments of the present disclosure;

FIG. 5 is a flow diagram of an example method for adaptive wear leveling in memory devices in accordance with some embodiments of the present disclosure.

DETAILED DESCRIPTION

Figure 1:
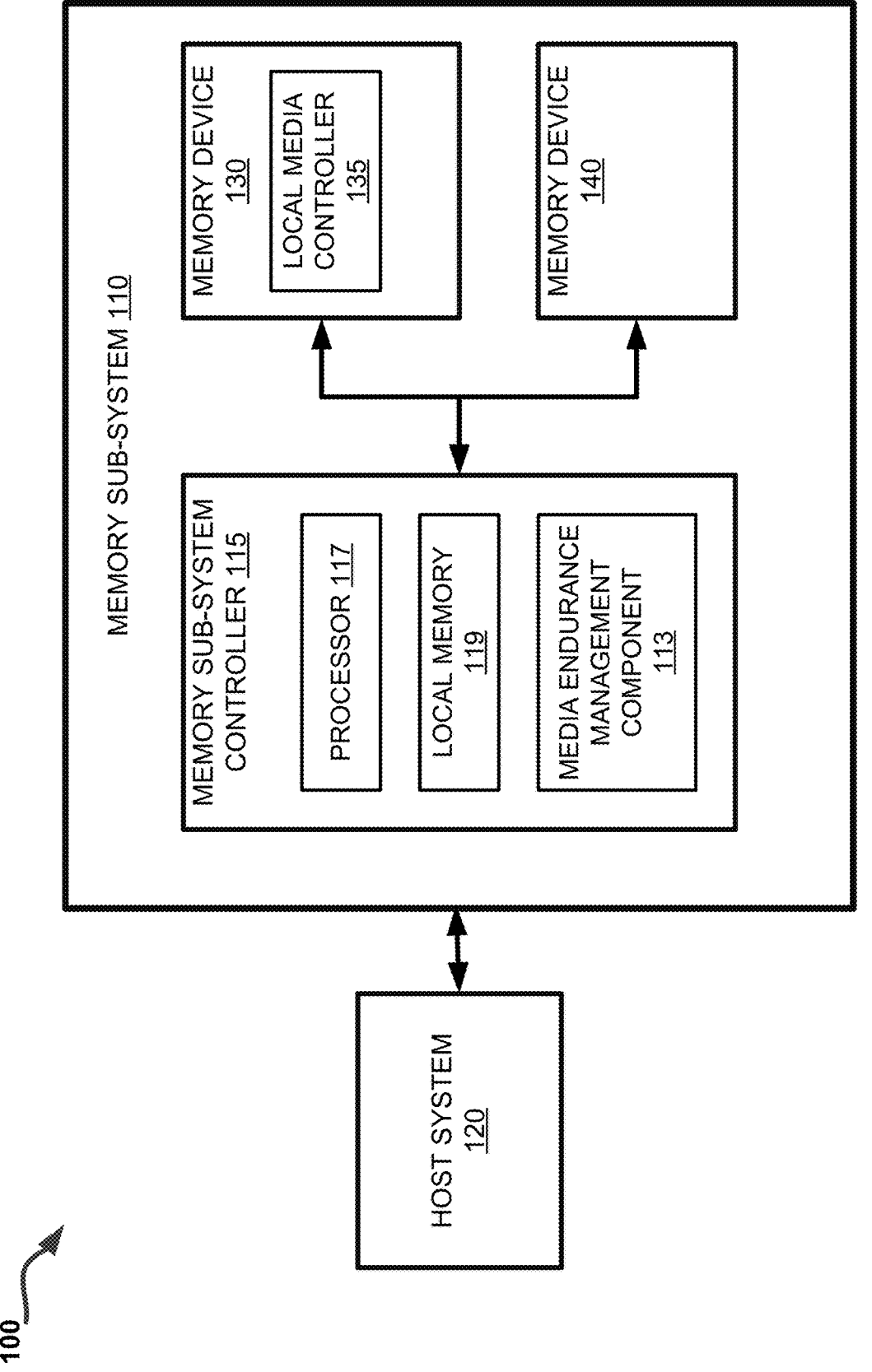
FIG. 1 illustrates an example computing system that includes a memory sub-system in accordance with some embodiments of the present disclosure.

Aspects of the present disclosure are directed to adaptive wear leveling in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane can consist of a set of physical blocks. In some embodiments, each block can include multiple sub-blocks. Each block can consist of a set of pages. Each page can consist of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include cells arranged in a two-dimensional or three-dimensional grid. Memory cells can be formed on a silicon wafer in an array of columns connected by conductive lines (also hereinafter referred to as bitlines or BLs) and rows connected by conductive lines (also hereinafter referred to as wordlines or WLs). A wordline can refer to a conductive line that connects control gates of a set (e.g., one or more rows) of memory cells of a memory device that are used with one or more bitlines to generate the address of each of the memory cells. In some embodiments, each plane can carry an array of memory cells formed onto a silicon wafer and joined by conductive BLs and WLs, such that a wordline joins multiple memory cells forming a row of the array of memory cells, while a bitline joins multiple memory cells forming a column of the array of memory cells. The intersection of a bitline and wordline constitutes the address of the memory cell. A block hereinafter refers to a unit of the memory device used to store data and can include a group of memory cells, a wordline group, a wordline, or individual memory cells addressable by one or more wordlines. One or more blocks can be grouped together to form separate partitions (e.g., planes) of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

In certain multi-plane memory devices such as memory devices with memory cells arranged in an array ("a memory array") of worldliness and bitlines, there can be a one-to-one correspondence between a memory array associated with each plane and other related circuitry, such as for example, an independent plane driver circuit, with bitline bias circuitry, a sense amplifier, and a number of registers. In some cases, the independent plane driver circuits allow for parallel and concurrent memory access operations to be performed on the respective memory arrays of each plane of the multi-plane memory device. In devices capable of such parallelism, the logical address space mapped to physical locations on the memory device can include multiple management units (MUs), such that, as explained in more detail below, each MU can include one or more data-storing elements. Each of these data-storing elements, such as cells (e.g., connected within an array of WLs and BLs), pages, blocks, planes, dies, and combinations of one or more of the foregoing elements, can be referred to as "data storage units". For the purposes of this disclosure, in the context of two data storage units, the data storage unit that can include or subsume the other data storage unit can be referred to as the "higher-order data storage unit". Similarly, in the same context, storage unit that can be included in or subsumed by the other data storage unit can be referred to as the "lower-order data storage unit".

In some examples, an MU can be an addressable data storage unit that includes a predefined number of smaller addressable data storage units of an order that is lower than the MU. Thus, an MU can be super block that includes a predefined number (e.g., 4, 6, 12) of blocks. As used herein, an MU can be referred to as complete if it contains the predefined number of usable lower-order data storage units. Conversely, an MU can be referred to as incomplete if it contains fewer than the predefined number of usable lower-order data storage units. Accordingly, a complete super block can refer to an MU that includes one usable block from each plane on a set of dies of a memory device. Each of the blocks of the super block can be located on a separate plane having independent circuitry allowing parallel operations to be performed on all the blocks of the super block. Accordingly, the use of parallel memory operations can provide an increase of memory device operation performance that is proportional to the number of parallel operations that can be performed.

The MUs and their constituent data storage units can be written to, read from, and/or erased a finite number of times on the memory device before physical wear degrades the media. For example, as operations are performed on the blocks of the memory device, some blocks can accumulate errors, become defective, or otherwise become unusable. As data storage units such as blocks within a plane of a memory device become unusable, they can no longer be available for parallelism across planes (i.e., no longer available for parallel concurrent operations using multiple independent plane driver circuits on multiple corresponding planes). Accordingly, the accumulation of worn out data storage units leads to a reduction in the capacity and performance of the memory device.

The longevity of a memory device and its components depends on the capability of the components to endure repeated use and continue to retain data in a valid readily accessible state. Accordingly, the data retention capability of a memory device can depend on a duration or a quantity of operations that its data storage units and other constituent components can endure. This data retention capability can be represented as an endurance rating of a component of the memory device as well as of the memory device as a whole. An endurance rating of a memory device can be measured in terms of the Total count of the Bytes Written (TBW) by a host system to the memory device before the memory device becomes unreliable.

Furthermore, because the operation of the memory device involves the data being accessed, moved, rewritten, and/or erased after initially being written on the device, a particular TBW can entail a significantly larger aggregate amount of data being written on the data storage units of the memory device collectively. Therefore, for the constituent components (e.g., data storage units) of a memory device, the data retention capability can depend on the measure of the quantity of memory access operation (e.g., program-erase operation cycles) that the components of the memory device can be subjected to before becoming unreliable. Accordingly, the data retention capability of the data storage units of the memory device be referred to as a media endurance rating since it reflects a maximum number of program-erase operation cycles (P/E cycles) that the data storage medium of the memory device can endure before the data can no longer be reliably accessed on the data storage units.

Additionally, the capability of a data storage unit (or, in the aggregate, of the whole memory device) for retaining stored data over time can be expressed as a maximum data retention time, and can be a function of the count of program-erase cycles that the data storage unit has undergone and temperature that it had experienced. Therefore, to ensure that no single component or data storage unit of the memory device expires significantly earlier than the remaining ones, it is beneficial to balance the stress and causes of media deterioration across all the data storage units so that they all reach the end of their useful service life at around the same time. Such balancing can be referred to as wear leveling since it levels out the wear experienced across the data storage units of the memory device.

However, due to the manufacturing processes used to create them, the constituent materials, media, components, data storage units, and other elements of a memory device often have non-uniform stress tolerances and endurance rating. Therefore, during manufacturing, the data storage units (e.g., dies) of the memory devices can undergo testing to estimate or determine the endurance and/or data retention capability of the data storage units. Since P/E operations performed on a data storage unit incrementally degrade the storage medium, they cause the quantity of errors generated when attempts to access the data are made to increase. Therefore, the data retention capability and the endurance of the memory device can be measured through the induction of stress in a data storage unit by continually subjecting it to repeated P/E cycles and monitoring changes to the raw bit error rate (RBER) that results when the data in the data storage unit is accessed.

As the cumulative amount of P/E cycles performed on the data storage unit increases, the RBER will rise to a level (e.g., will exceed a threshold value) which the memory device cannot compensate for to reliably access/read the data on the data storage unit. Accordingly, the cumulative amount of data access operations represented by the total count of the P/E cycles can serve as a media endurance metric value beyond which the data storage units of the memory device cannot reliably store data. Therefore, the data storage unit can be assigned a media endurance rating reflecting the count of P/E cycles that it can endure. Although, in the examples of this disclosure, the media endurance rating can indicate a particular range of media endurance metric values among two or three ranges (e.g., a low/high, or, a low/medium/high media endurance rating), the possible media endurance metric values can be divided into any number of ranges defined by corresponding demarcation values.

Accordingly, the media endurance rating can be assigned at any arbitrary levels of granularity. Further, with respect to an MU or an higher-order data storage unit (e.g., die, block, page, cell, and combinations of the foregoing, etc.) for the entirety of which a record of the count of P/E cycles has not been kept, a media endurance rating corresponding to that of an individual (e.g., lowest) or aggregate (e.g., average) value of the data state metric (e.g., P/E cycle count) of one or more of its lower-order data storage units can be assigned. As used herein, a data storage unit (e.g., die, block, cell, etc.) that is assigned a high media endurance rating can be referred to as a high endurance data storage unit and a data storage unit that is assigned a low media endurance rating can be referred to as a low endurance data storage unit. Furthermore, a higher-order data storage unit can be referred to as having the same media endurance rating as its constituent lower-order data storage units. Similarly, a lower-order data storage unit can be referred to as having the same media endurance rating the higher-order data storage unit on which it resides. A higher-order data storage unit (e.g., MU) containing lower-order data storage units with various media endurance ratings can be referred to as a mixed endurance data storage unit.

Accordingly, each data storage unit (e.g., die) can be assigned a media endurance rating based on the media endurance metric value that reflect the statistics and analytics related to the manufacturing process of the die, on the performance of other dies manufactured under similar conditions, or on other metrics related to the manufacturing, as well as on the inspection, testing, or performance of the data storage unit. In the production of some memory sub-systems, components that do not satisfy specific endurance requirements are excluded from use in the memory devices. For example, dies that exhibit a lower than minimum threshold media endurance rating (i.e., that become unreliable at a media endurance metric value that is lower than a corresponding threshold values) are discarded. Thus, memory devices are often built exclusively with dies that have certain predetermined media endurance rating requirements (e.g., high endurance dies). The dies that do not meet those requirements (e.g., low endurance dies) are wasted as they are not included in the memory device. This practice lowers the overall production yield of memory sub-systems and increases the manufacturing costs due to the inability to use dies that do not meet minimum requirements.

To reduce the waste of low endurance components, some systems incorporate such components in memory devices and mitigate the lower data retention capability (i.e., quicker relative rate of deterioration) by periodically excluding data storage units on such components from being used for memory access operations. More specifically, in some memory sub-systems, low endurance blocks (i.e., blocks from low endurance dies) are periodically temporarily disabled and excluded from memory access operations being performed on super blocks on the memory device. Although this approach can achieve the goal of having low endurance components and high endurance components reaching the end of their useful service life at approximately the same time, disabling the low endurance data storage units decreases the storage capacity of the memory device (e.g., lowers the over provisioned storage capacity available for media management operations). Furthermore, it can also lead to inconsistent super block sizes (i.e., respective super blocks containing different amounts of constituent blocks) and cause inconsistent performance (e.g., varying write speeds as data is written to super blocks of different sizes). Accordingly, this results in unused capacity and decreased write performance due to the accumulation of disabled blocks, and smaller superblocks.

Aspects of the present disclosure address the above and other deficiencies by using separate sets of MUs (i.e., higher-order data storage units, e.g., super blocks) where the lower-order data storage units (e.g., blocks) of the MUs of each respective set have the same media endurance rating (i.e., by avoiding the use of mixed endurance MUs). More specifically, by having one set of super blocks exclusively containing high endurance blocks and another set of super blocks exclusively containing low endurance super blocks (i.e., by foregoing the creation or utilization of super blocks whose constituent blocks reside on dies with different respective media endurance ratings), embodiments of this disclosure can perform wear leveling on the memory device at the level of super blocks. To even out the rate of media degradation across the constituent components, the various embodiments can distribute the operations performed on the memory device to the different sets of super blocks based on a ratio that depends on the respective media endurance ratings and media endurance metrics (e.g., P/E cycle counts) of the super blocks. For example, logical block addresses with data that is updated more frequently can be mapped to the high endurance superblocks while logical block addresses with data that is updated less frequently can be mapped to the low endurance superblocks. In this manner, the waste of low endurance components is mitigated without disabling any data storage units or even temporarily lowering the capacity of the memory device.

Technical advantages of the present disclosure include reducing the amount of disabled or unused blocks and increasing the overall resources available on memory devices for performing parallel operation. Furthermore, by enabling the utilization of components with lower media endurance ratings that could be manufactured more quickly, the embodiments of this disclosure speed up the development of memory devices and decrease the time-to-market by utilizing more memory dies in the production of memory devices. Using components with lower media endurance ratings, results in fewer wasted components, thus reducing the cost to produce memory devices. Additionally, using the adaptive wear leveling methods described herein, the data storage units in low endurance MUs will be written to less frequently than the data storage units in high endurance MUs, resulting in all the data storage units in the memory device reaching the end-of-life around the same time. Furthermore, by fore going the use of mixed endurance MUs, the embodiments of the disclosure enable manufacturers to satisfy particular TBW requirements by utilizing the previously unused endurance margin of the high endurance data storage units. This can result in an increase in the overall lifetime (i.e., an increase of the maximum TBW) of a memory sub-system and the prevention of premature failure of the memory sub-system by adaptively distributing operations are to the different management units on the memory device. Thus, as explained in more detail below, the embodiments of the present invention reduce latency (i.e., increase the speed) for host operations by increasing the resources available for parallel operations and increase the available storage capacity on memory devices.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dies and/or channels to form management units (MUs). In some embodiments, an MU can refer to a memory cell, a set of cells connected to a wordline, a page, a block, or a combination of one or more of the foregoing. An MU can refer to set of one or more individual data storage units of the memory device 130 that can be written or erased in a single operation. For example, memory device 130 can be divided into multiple MUs, where each MU includes one or more blocks. An MU containing a predefined total number of usable blocks where each block is located on a different plane of a memory device 130 can be referred to as a super block.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a media endurance management component 113 that can identify groups of data storage units (e.g., MUs) on dies with different media endurance ratings and perform wear leveling by managing the distribution of operations to the different data storage units on a memory device 130, 140. In some embodiments, the memory sub-system controller 115 includes at least a portion of the media endurance management component 113. In some embodiments, the media endurance management component 113 is part of the host system 120, an application, or an operating system. In other embodiments, local media controller 135 includes at least a portion of media endurance management component 113 and is configured to perform the functionality described herein.

The media endurance management component (MEMC) 113 can, in some embodiments, operate in conjunction with the memory device 130 that can have the following hierarchy of components: the memory device can contain one or more dies; each die can have one or more planes; each plane can include one or more blocks; each block can contain pages of memory cells arranged into arrays of intersecting wordlines and bitlines. For the purposes of this disclosure, an MU can refer to an addressable set of memory cells that includes addressable subsets of memory cells, where each subset can reside on one or more dies. Accordingly, a super block, a block, a page, a group of cells, etc. can be examples of an MU. As noted, in several embodiments, multiple lower-order data storage units (e.g., cells) can be grouped together to form higher-order data-order age units (e.g., pages) on the memory device 130. For example, blocks on the memory device 130 can be grouped together into super blocks. The present disclosure emphasizes some embodiments where the higher-order data storage units (i.e., $Unit_1$) are represented by super blocks (i.e., MUs) that are formed from respective groups of lower-order data storage (i.e., Unita) that are represented by blocks (i.e., embodiments where relationships between higher-order data storage units and lower-order data storage units are represented by the relationships between super blocks and blocks). In other embodiments, analogous relationships are contemplated with respect other $Unit_1$:$Unit_2$ pairs in the hierarchy (i.e., relationships between $Unit_1$:$Unit_2$ pairs such as die:plane, die:block, die:cell array, die:cell, super block:block, super block:page, super block:cell array, super block:cell, block:page, block:cell array, block:cell, plane:block, plane:page, plane:cell array, plane:cell, block:page, block:cell array, block:cell, page:half-page, page:cell array, page:cell, block:wordline, plane:block-and-page-combination, super block:page-and-cell-combination, die:page-and-cell-array-combination, etc.).

Thus, in some embodiments where the data storage units of the of the memory device 130 have not yet been grouped into MUs, the MEMC 113 can group the data storage units of the memory device 130 into MUs. For example, in some embodiments, the MEMC 113 can group multiple blocks together to form super blocks. In some embodiments, during the creation of the MUs, the MEMC 113 can group lower-order data storage units based on the media endurance metric exhibited by the higher-order data storage units on which they reside such that the MEMC 113 generates some high endurance MUs and some low endurance MUs. In this case the high endurance MUs can respectively have each of their constituent lower-order data storage units be located on a die assigned a high media endurance rating while the low endurance MUs can respectively have each of their constituent lower-order data storage units be located on a die assigned a low media endurance rating.

For example, the MEMC 113 can generate, from the blocks on memory device 130, a set of high endurance super blocks that only include blocks residing on dies exhibiting a high media endurance metric, and a set of low endurance super blocks that only include blocks residing on dies exhibiting a low media endurance metric. In some embodiments, such as those where the data storage units of the memory device 130 have already been grouped into MUs, the MEMC 113 can identify, among all of the MUs, some high endurance MUs and some low endurance MUs. Analogously, in some embodiments, where the blocks on a device have already been grouped into super blocks, the MEMC

113 can identify, within all of the super blocks, some high endurance super blocks and some low endurance super blocks.

In the various embodiments disclosed herein, the MEMC 113 can receive commands to perform different types of operations on memory device 130. Thus, in some embodiments, the MEMC 113 can perform one write operation (e.g., a write operation that updates a frequently updated portion of data) on one or more high endurance management units and perform another write operation (e.g., a write operation that updates an infrequently updated portion of data) on one or more low endurance management units. For the purposes of this disclosure, an operation that is initiated by the host system 120 can be referred to herein as a "host-initiated" operation, while an operation that is initiated by the memory sub-system 110 can be referred to herein as a "sub-system-initiated" operation. In some cases, some operations can be performed exclusively using high endurance management units while other operations are performed exclusively using low endurance management units. In other cases, some operations can be performed using both high endurance and low endurance management units (e.g., super blocks). Thus, in some embodiments, the MEMC 113 can perform some write operations exclusively on high endurance super blocks and perform other write operations exclusively on low endurance super blocks, to perform wear leveling as explained in more detail below.

In some embodiments, after the MEMC 113 has either generated or identified the management units on the memory device 130, the MEMC 113 can identify multiple sets of management units to be programmed, where each data storage unit (e.g., a group of memory cells, a block) within a management unit of one set resides on a die exhibiting a particular value of media endurance metric rating and each data storage unit (e.g., a group of memory cells, a block) within another management unit in another set resides on a die exhibiting a second media endurance rating. In some embodiments, the management unit of one set can comprise data storage units that exclusively reside on one die while the management unit of the other set can comprise data storage units that exclusively reside on a different die. For the purposes of this disclosure, the value of the media endurance metric can refer to a raw or absolute value as well as to a value of the metric normalized relative to the media endurance rating of a die. In some embodiments, each of the media endurance ratings can indicate a respective number of memory access operations (e.g., program erase operation cycles) that the MU can be subjected to prior to becoming unreliable. For example, the MEMC 113 can identify two sets of super blocks such that each block in one super block in one set is located on a die that has a high media endurance rating (e.g., a high maximum tolerated P/E cycle count) and each block in another super block in the other set is located on a die that has a low media endurance rating (e.g., a low maximum tolerated P/E cycle count). Similarly, the MEMC 113 can identify two sets of super blocks such that each block in one super block in one set is located on a die that has a high media endurance state metric (e.g., a high maximum absolute P/E cycle count, high maximum normalized P/E cycle count) and each block in another super block in the other set is located on a die that has a low media endurance state metric (e.g., a low maximum absolute P/E cycle count, low maximum normalized P/E cycle count). Thus, in some embodiments, the MEMC 113 can, determine a respective value of a media endurance metric for each management unit. For example, the MEMC 113 can determine a respective value of a media endurance metric for each super block. In some cases, the value of a media endurance metric can be an absolute count of program-erase operation cycles, while in others it can be a normalized count of program-erase operation cycles performed on the management unit.

A value of a media endurance metric of a data storage unit (e.g., MU, die) can be normalized to various scales such as an interval scale, ratio scale, and a difference scale. The scales can be scales can be defined relative to the maximum endurance of the data storage unit, relative to the absolute measure of the media endurance metric another data storage unit, or an arbitrary value reflective of an absolute or relative measure of the media endurance metric.

In some embodiments, to determine a normalized media endurance metric value of an MU (i.e., relative to the maximum endurance of the MU), the MEMC 113 can divide an absolute measure of a media endurance metric value that represents the current state of the MU and divide it by the media endurance rating, expressed in units of the media endurance metric, of the die on which the lower-order data storage units of the MU reside. This will provide a ratio of the MU's maximum endurance that the MU has experienced. For example, the MEMC 113 can determine a current absolute P/E cycle count of a super block and divide it by the media endurance rating, expressed in counts of P/E cycles, of the die on which the blocks of the super block reside. For example, if one super block contains only blocks that are located on dies assigned a media endurance rating of 15000 P/E cycles and the count of P/E cycles performed on the super block is 5000 (i.e., the super block has a has experienced 5000 P/E cycles) then the normalized P/E cycle count ratio can be expressed as ⅓ or $0.\overline{3}$.

In other embodiments, to determine a measure of a media endurance metric of one MU that is proportionally equivalent to a measure of the media endurance metric of another MU (i.e., convert measures of the metric on one MU to equivalent measures of the metric of another MU in terms of a proportion of its media endurance rating), the MEMC 113 can divide the absolute measure of the media endurance metric of the MU by the ratio of the MU's media endurance rating to the media endurance rating of the other MU. This will provide a measure of the media endurance metric of the other MU that, is proportionally equivalent (i.e., on a scale relative to the maximum endurance of the other MU) to the measure of the media endurance metric of the MU. For example, to determine a proportional P/E cycle count for one of the two MUs, the MEMC 113 can select one of them to be designated a target MU and the other one to be designated a reference MU. Then, the MEMC 113 can divide the absolute P/E cycle count of the target MU by the ratio of its media endurance rating to the media endurance rating of the reference MU. For example, if the high endurance super block is designated as the target and has a media endurance rating of 12000 P/E cycles while the low endurance super block is designated as the reference and has a media endurance rating of 10000 P/E cycles, then, if the high endurance super block experienced 120 P/E cycles, the proportionally equivalent P/E cycle count of the low endurance super block would be $$120 \div \frac{12000}{10000} = 100.$$

In some embodiments, the MEMC 113 can determine for each management unit, a respective endurance exhaustion parameter defined by the relationship between the value of the media endurance metric of the die on which the data storage units (e.g., memory cells, blocks) of the management unit reside and an aggregated (e.g., total, normalized, average, maximum, minimum, median, multiple) value of the media endurance metric of one or more dies on the memory device 130. In some cases, the endurance exhaustion parameter can be defined by the relationship between the media endurance metric of a particular die on memory device 130 die and the media endurance rating of that die. Accordingly, as described in more detail below, in some embodiments the MEMC 113 can determine, for each MU, a respective endurance exhaustion parameter that depends on a ratio of the media endurance metric exhibited by the die on which the lower-order data storage units of the MU reside (i.e., an absolute measure of the media endurance metric of the MU) and the media endurance rating of that die (i.e., a media endurance rating of the MU). In other words, the endurance parameter of an MU, can, be represented as a normalized media endurance metric, where the media endurance metric of the MU is normalized relative to the media endurance rating of the MU. Thus, in some embodiments, the MEMC 113 can determine, for each super block, a respective endurance exhaustion parameter that is defined by the ratio of the absolute P/E cycle count of the super block to media endurance rating of the super block (i.e., of the die on which the blocks of the super block exclusively reside) expressed in terms of a maximum P/E cycle count.

In some cases, the endurance exhaustion parameter can be defined by the relationship between the media endurance metric of one die and the media endurance metric of another die. For example, the endurance exhaustion parameter can be defined by a relationship of the normalized measure of the media endurance metric of the die on which the data storage units of the MU reside and the average normalized value of the media endurance metric of a group of dies on the memory device 130. In some embodiments, the MEMC 113 can determine, for each super block, a respective endurance exhaustion parameter defined by the ratio of the normalized P/E cycle count of one super block to the average normalized P/E cycle count of a group of super blocks on the memory device 130.

Additionally, as in the normalization ratio for the normalized media endurance rating, the endurance exhaustion parameter can also depend on the ratio of the media endurance rating of one die to the media endurance rating of another die. In some embodiments, the MEMC 113 can determine, for each super block, a respective endurance exhaustion parameter that depends on a ratio of the media endurance rating of the high endurance super block to the media endurance rating of the other super block.

The MEMC 113 can determine, for each management unit, a ratio of a total number of memory access operations to be performed that can be based on the respective endurance exhaustion parameter and can be based on its respective value of the media endurance metric. In some embodiments, having determined the endurance exhaustion parameter, the MEMC 113 can also determine, for each super block, the ratio of the total number of memory access operations to be performed (e.g., future memory access operations as represented by a quantity of PIE cycles) based on the respective endurance exhaustion parameter and the respective value of the media endurance metric (e.g., a current count of the P/E cycles for each respective super block). For example if the high endurance super block has a P/E cycle count of 3000 and a media endurance rating of 15000 P/E cycles, the low endurance super block has a P/E cycle count of 3000 and a media endurance rating of 12000 P/E cycles, then, the MEMC 113 can determine the endurance exhaustion parameter to be $$0.8\left(\text{i.e., } 1 - \frac{3000}{15000}\right)$$

for the high endurance super block and $$0.75\left(\text{i.e., } 1 - \frac{3000}{12000}\right)$$

for the low endurance super block. In another example, if the high endurance super block has a normalized P/E cycle count of 4000, the low endurance super block has a normalized P/E cycle count of 6000, while the average normalized P/E cycle count of the remaining super blocks on the memory device is 5000, the MEMC 113 can determine the endurance exhaustion parameter to be 4/5 for the high endurance super block and 6/5 for the low endurance super block.

In yet another example if the high endurance super block has a media endurance rating of 12000 P/E cycles while the low endurance super block has a media endurance rating of 10000 P/E cycles, then, the MEMC 113 can determine that each P/E cycle on the low endurance super block is equivalent to 1.2 P/E cycles on the low endurance super block in terms of a proportion of the respective maximum endurance of each super block. Furthermore, if, in the same example, the high endurance super block had already experienced 2000 P/E cycles while the low endurance super block had experienced 1000 P/E cycles, the ratio of their respective remaining lifetimes would have changed. Accordingly, the MEMC 113 can calculate the remaining quantity of P/E cycles that each of the super blocks can endure to determine ratio of memory access operations that should be performed on each of the super blocks. In the abovementioned example, the ratio of the respective remaining quantities of P/E cycles that each of the super blocks can endure would become $$\frac{12000 - 2000}{10000 - 1000} = \frac{10000}{9000} = \frac{10}{9}.$$

In the same or other embodiments, the MEMC 113 can, distribute operations to each management unit based on the ratio. For example, the MEMC 113 can distribute the operations such that for every nine P/E cycles that the MEMC 113 performs on the low endurance super block, the MEMC 113 performs ten P/E cycles on the high endurance super block. While distributing the operations to each management unit, the MEMC 113 can, maintain a difference between a count of program erase operation cycles performed on one management unit and the count of program erase operation cycles performed on another management unit, such that the difference is below a maximum difference (i.e., maintain a maximum program-erase count gap between the management units). For example, in some cases the maximum difference (i.e., the maximum value below which the MEMC 113 maintains the program-erase count gap) can be defined in terms of a percentage of the media endurance metric value of an MU. In another example, the maximum difference can be defined in terms of a percentage of the maximum count of program-erase operations reflected by the media endurance metric of a die. In other embodiments, the maximum difference (maximum program-erase count gap) the MEMC 113 maintains can be defined as the difference of the absolute or normalized counts of program-erase operation cycles performed.

Accordingly, in some embodiments, the MEMC 113 can determine, for each super block, a respective endurance exhaustion parameters and ratios that can depend on the respective values of the media endurance metrics of one or more super blocks and on the relationship between the media endurance rating of one die and the media endurance rating of another die on the memory device 130. In some cases, the MEMC 113 can use the normalized values of the media endurance metric to determine the relative endurance exhaustion parameters for each super block and to determine the ratio of operations to perform on each super block. For example, the MEMC 113 can determine that a low endurance super block in a group has a normalized P/E cycle count of 0.2, indicating that the low endurance super block has 80% of remaining media endurance, and that a high endurance super block in the group has a normalized P/E cycle count of 0.4, indicating that the high endurance super block has 60% of remaining media endurance. Accordingly, if all the super blocks in the group have an average normalized P/E cycle count of 0.3, indicating that, on average, all of the super blocks have 70% of remaining media endurance, then the MEMC 113 can determine that the relative endurance exhaustion parameter is 8/7 for the high endurance super block and 6/7 for the low endurance super block. Accordingly, the MEMC 113 can determine the ratio of the normalized and absolute quantity of memory access operations to be performed on each of the super blocks relative to one or more other super block in the group. In this case, the MEMC can determine that ratio of the normalized quantity of memory access operations (e.g., P/E operation cycles) to be performed on the low endurance super block relative to the average normalized quantity of memory access operations to be performed on each of the super blocks in the group to be 6:7. Similarly, the MEMC can determine that ratio of the normalized quantity of memory access operations to be performed on the high endurance super block relative to the average normalized quantity of memory access operations to be performed on each of the super blocks in the group to be 8:7. Analogously, the MEMC can also determine that ratio of the normalized quantity of memory access operations to be performed on the low endurance super block relative to the normalized quantity of memory access operations to be performed on the high endurance super block to be 6:8.

In some embodiments, to determine the ratio of the respective absolute quantities of memory access operations to be performed on each super block, the MEMC 113 can divide each relative endurance exhaustion parameter by the media endurance rating (i.e., measured in units of the media endurance metric) of the super block. For example, if a die assigned a media endurance rating of 12000 P/E cycles, on which the blocks of a particular super block reside, exhibits a normalized P/E cycle count of 0.4, and on average the dies of a group of dies on the memory device 130 exhibit a normalized P/E cycle count of 0.35, then the MEMC 113 can determine that the relative endurance exhaustion parameter for this particular super block is 0.6/0.65 and divide it by 12000 to determine the ratio (i.e., 1/13000) of the absolute quantity of memory access operations (e.g., P/E cycles) to be performed on this particular super block to the total absolute quantity of memory access operations (e.g., P/E cycles) to be performed. In some embodiments, to determine the ratio of the respective absolute quantities of memory access operations to be performed on each super block, the MEMC 113 can multiply each ratio of the normalized quantities by the ratio of the corresponding media endurance ratings, measured in units of the media endurance metric. For example, if the MEMC 113 determines the ratio of the normalized quantity of memory access operations to be performed on a low endurance super block (e.g., a super block with media endurance metric of 10000 P/E cycles) relative to the normalized quantity of memory access operations to be performed on the high endurance super block (e.g., a super block with media endurance metric of 12000 P/E cycles) to be 6:9, the MEMC 113 can multiply it by 5/6 to determine the ratio (i.e., 8/10) of the absolute quantity of memory access operations (e.g., P/E cycles) to be performed on the low endurance super block to the absolute quantity of memory access operations (e.g., P/E cycles) to be performed on the high endurance super block.

Having determined the endurance exhaustion parameter and the ratio, the MEMC 113 can then distribute operations to each super block based on the endurance exhaustion parameter and/or based on the ratio. In some embodiments, as the MEMC 113 distributes, the MEMC 113 can also maintain a difference between a count of program erase operation cycles performed on one super block and the count of program erase operation cycles performed on another super block, such that the difference is below a maximum difference (i.e., maintain a maximum program-erase count gap between the respective counts of program erase operation cycles performed on each of two super blocks. In other words, in some embodiments the MEMC 113 may modify the ratio discussed above by permitting no more than a maximum difference between the respective absolute or normalized endurance metric values for each super block described earlier. In the various embodiments, the maximum difference between the absolute P/E cycle count of the high endurance super block and the absolute P/E cycle count of the low endurance super block can be represented by or defined in terms of (i) a percentage of the absolute P/E cycle count of the high endurance super block, or (ii) a percentage of the absolute P/E cycle count of the low endurance super block. In some cases, the maximum difference between the absolute P/E cycle count of the high endurance super block and the absolute P/E cycle count of the low endurance super block can be defined as an absolute difference between the respective counts of P/E cycles performed on each of the high endurance super block and the low endurance super block. In other embodiments, where the respective values media endurance metric are normalized P/E cycle counts, the maximum difference can be defined as a difference between the normalized P/E cycle count of the high endurance super block and the normalized P/E cycle count of the low endurance super block. In the same or alternative embodiments, the P/E cycle count gap can be represented in terms of a percent difference between the respective normalized counts of P/E cycles performed on each of the first super block and the second super block, and can also be represented in terms of an absolute difference between the respective normalized counts of P/E cycles performed on each of the high endurance super block and the low endurance super block.

In some embodiments, to distribute the operations to each MU (e.g., super block), the MEMC 113 can map logical block addresses (e.g., a logical block address range) with data that is modified more frequently to the high endurance MUs and map logical block addresses with data that is updated less frequently to the low endurance superblocks. Implementations of the various aspects and principles of the operation of the MEMC 113 mentioned above are described in more detail below with reference to FIGS. 2-3. Further details with regards to these generally described operations of the MEMC 113 are explained below with reference to FIGS. 4-5.

Figure 2:
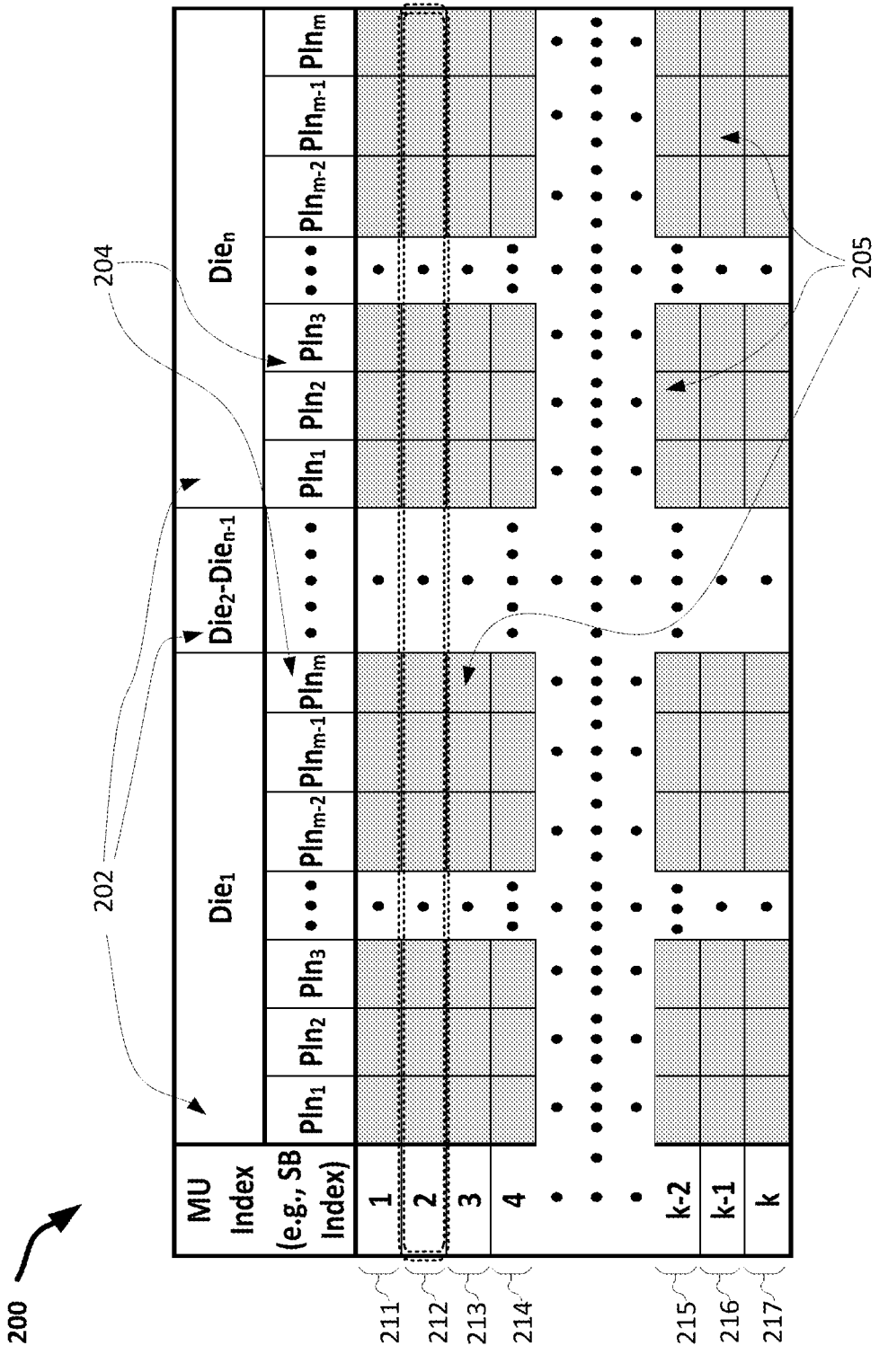
FIG. 2 is a schematic diagram of an example layout of a memory device with an arrangement of management units containing multiple blocks in accordance with some embodiments of the present disclosure.

FIG. 2 is a schematic diagram of an example layout of a memory device 200 with an arrangement of management units containing multiple blocks in accordance with some embodiments of the present disclosure. The memory device 200 depicted in FIG. 2 can, in some embodiments, be a memory device in a memory sub-system (e.g., memory device 130 of memory sub-system 110 of FIG. 1). As can be seen, in some embodiments, the memory device 200 can include a certain number n (e.g., 8) of dies 202, such as the dies illustratively labeled $Die_1$-$Die_n$ in this FIG. 2. Each die 202 can have several m (e.g., 4) planes 204, such as the planes illustratively labeled $Pln_1$-$Pln_m$, each of which respectively has k blocks 205. Each die 202 can exhibit a different media endurance rating such as a maximum aggregate number of P/E cycles its constituent components (e.g., planes 204, blocks, 205) can endure. Similarly, the different planes 204 and blocks 205 can likewise have various media endurance ratings.

In some embodiments, blocks 205 are used as the lower-order data storage units that are grouped into higher-order data storage units (e.g., super blocks 211-217) to generate the management units (MUs) on the memory device 230. For example, blocks 205 on memory device 230 can be grouped into k super blocks 211-217, which are examples of MUs. Each super block 211-217 can include multiple blocks each of which reside on a different plane 204, such that if each super block 211-217 includes one block 205 from each of the m planes 204, each super block 211-217 would contain the predetermined number m×n (e.g., 8×4=32) blocks. In these embodiments, a complete super block 211, 214, 217 is a super block containing m×n blocks 205. In the depicted embodiments, if dies 202, such as the dies illustratively labeled $Die_1$-$Die_n$ exhibit different respective media endurance ratings, then super block 212 would not be created or used as it would be a mixed endurance super block. However, across a memory device 200, dies 202 are often exhibit non-uniform media endurance ratings and, consequently, contain blocks of different media endurance ratings.

In the depicted embodiments, each of the n dies of memory device 200 includes m planes resulting in m×n planes 204 in total and each plane includes k blocks resulting in m×n×k on the memory device 200. Because each super block can include at most one usable block 205 from each plane 204 and because each plane 204 can concurrently be accessed for the performance of parallel write operations, an entire super block can be accessed using full parallelism (i.e., the performance of operations on each of the constituent usable blocks 206 of a super block in parallel). Accordingly, a volume of data equivalent to the capacity of the entire super block can be written to the super block simultaneously. Furthermore, the super blocks 211-217 can be defined such that they contain a different number n/2 (e.g., 4) of blocks such that all the blocks in each respective super block reside on dies having the same media endurance rating. In this example, because the remaining blocks on the remaining n/2 dies remain available for incorporation into super blocks 211-217, performance speed due to parallelism is maintained.

Accordingly, in some embodiments, to maximize the efficient utilization of the endurance and data retention capability of the components (e.g., dies 202) of the memory device 200, different sets of MUs can be created such that all of the constituent lower-order data storage units of the MUs of each set reside on a component exhibiting the same media endurance rating. The use of such different sets of MUs is further clarified and explained in more detail with reference to FIG. 3.

Figure 3:
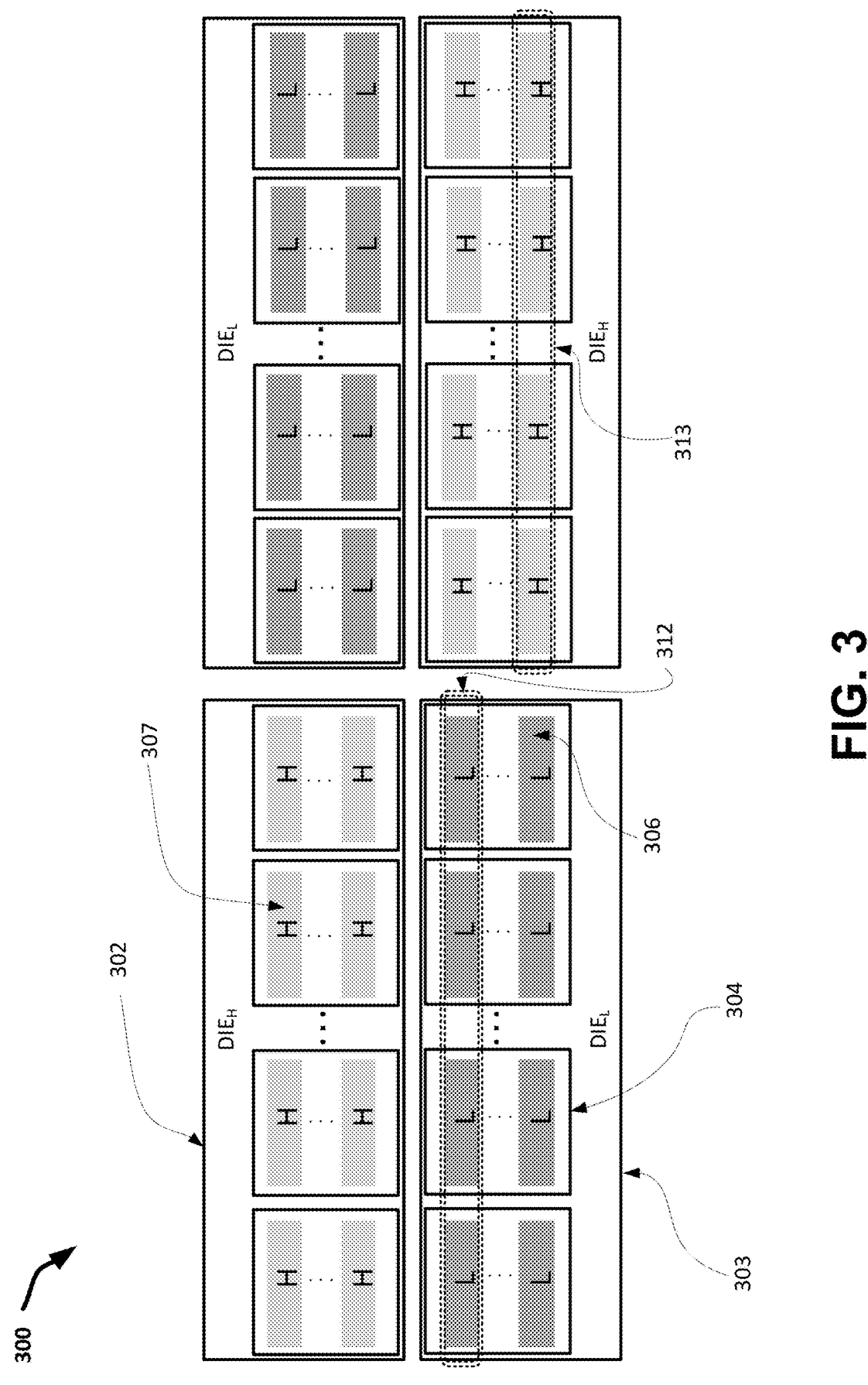
FIG. 3 is a is a schematic diagram of an example layout of a memory device having different management units respectively containing blocks either exclusively from high endurance dies or exclusively from low endurance dies in accordance with some embodiments of the present disclosure.

FIG. 3 is a schematic diagram of an example layout of a memory device 300 having different management units respectively containing blocks either exclusively from high endurance dies or exclusively from low endurance dies in accordance with some embodiments of the present disclosure. As can be seen, memory device 300 includes dies 302 that exhibit (e.g., as assigned during manufacturing) a high media endurance rating as well as dies 303 that exhibit a low media endurance rating. Each die 302, 303 can have multiple planes 304 that include multiple blocks 306, 307.

As noted previously, blocks 306 can be referred to as low endurance blocks since they are disposed on low endurance dies 303 (i.e., dies exhibiting a low media endurance rating). Analogously, blocks 307 can be referred to as low endurance blocks since they are disposed on low endurance dies 302 (i.e., dies exhibiting a high media endurance rating). Accordingly, in the depicted layout, memory access operations can be distributed to a high endurance MU whose constituent data storage units all reside on dies with a high endurance rating, and to a low endurance MU whose constituent data storage units all reside on dies with a low endurance rating. More specifically, in some embodiments, low endurance super block 312, all of whose blocks are low endurance blocks 306 residing on low endurance die 303, can have one portion of the media operations distributed to it, while high endurance super block 313, all of whose blocks are high endurance blocks 307 residing on high endurance die 302 can have a different portion of the media operations distributed to it, based on a ratio derived from a relationship between the respective high and low media endurance ratings and the respective media endurance metrics of the super blocks 312, 313. The numbers of dies 202, 302 planes 204, 304 super blocks 211-217, 311-312 and blocks 205, 306, 307 in the illustrative examples of FIGS. 2-3 are chosen for illustrative purposes and are not to be interpreted as limiting. Other embodiments can use various other numbers of dies 202, 302 planes 204, 304 and blocks 205, 306-307 and various numbers of super blocks 211-217, 311-312 resulting from the respective different allocations of blocks 205, 306-307 can be used in the various embodiments disclosed herein.

FIG. 4 is a flow diagram of an example method 400 for adaptive wear leveling memory devices in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the MEMC 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In some embodiments of the present disclosure, at operation 402, the processing logic can identify multiple management units in each of two groups of management units that are to be programmed. Each data storage unit (e.g., a group of memory cells, a block) within a management unit of the first group can reside on a one die that exhibits a high media endurance metric while each data storage unit (e.g., a group of memory cells, a block) within another management unit of the other group resides on another die that exhibits a low media endurance metric. For example, the processing logic can, at operation 403, group the data storage units of the memory device into MUs. In some embodiments, during the creation of the MUs, at operation 403, the processing logic can group the data storage units such that it generates some high endurance MUs and some low endurance MUs. In other embodiments, such as those where the data storage units of the memory device have already been grouped into MUs, the processing logic can, at operation 402, identify, among all of the MUs, some high endurance MUs and some low endurance MUs. For example, in some embodiments where the blocks on a memory device have already been grouped into super blocks, the processing logic can, at operation 402, identify, within all of the super blocks, some high endurance super blocks and some low endurance super blocks. In a similar example, the processing logic can identify two sets of super blocks such that each block in one super block in one set is located on a die that has a high media endurance state metric (e.g., a high maximum absolute P/E cycle count, high maximum normalized P/E cycle count) and each block in another super block in the other set is located on a die that has a low media endurance state metric (e.g., a low maximum absolute P/E cycle count, low maximum normalized P/E cycle count).

Thus, in some embodiments, the processing logic can, at operation 406, determine a respective value of a media endurance metric for each management unit. For example, the value of a media endurance metric that the processing logic determines at operation 406 can be an absolute count of program-erase operation cycles and can be a normalized count of program-erase operation cycles performed on the management unit. In some embodiments, to determine a normalized media endurance metric value of an MU (i.e., relative to the maximum endurance of the MU), the processing logic can divide an absolute measure of a media endurance metric value that represents the current state of the MU and divide it by the media endurance rating, expressed in units of the media endurance metric, of the die on which the lower-order data storage units of the MU reside. This will provide a ratio of the MU's maximum endurance that the MU has experienced. For example, the processing logic can determine a current absolute P/E cycle count of a super block and divide it by the media endurance rating, expressed in counts of P/E cycles, of the die on which the blocks of the super block reside. For example, if one super block contains only blocks that are located on dies assigned a media endurance rating of 15000 P/E cycles and the count of P/E cycles performed on the super block is 5000 (i.e., the super block has a has experienced 5000 P/E cycles) then the normalized P/E cycle count ratio can be expressed as ⅓ or 0.3.

At operation 410, the processing logic can determine for determine for each management unit, a respective endurance exhaustion parameter defined by the relationship between the value of the media endurance metric of the die on which the data storage units (e.g., memory cells, blocks) of the management unit reside and an aggregated (e.g., total, normalized, average, maximum, minimum, median, multiple) value of the media endurance metric of one or more dies on the memory device. In some cases, the endurance exhaustion parameter can be defined by the relationship between the media endurance metric of one die and the media endurance metric of another die. For example, the endurance exhaustion parameter can be defined by a relationship of the normalized measure of the media endurance metric of the die on which the data storage units of the MU reside and the average normalized value of the media endurance metric of a group of dies on the memory device. In some embodiments, the processing logic can determine, for each super block, a respective endurance exhaustion parameter defined by the ratio of the normalized P/E cycle count of one super block to the average normalized P/E cycle count of a group of super blocks on the memory device.

At operation 414, the processing logic can determine, for each management unit, a ratio of a total number of memory access operations to be performed based on the respective endurance exhaustion parameters, ratios, and values of the media endurance metrics, and media endurance ratings. For example if the high endurance super block has a P/E cycle count of 3000 and a media endurance rating of 15000 P/E cycles, the low endurance super block has a P/E cycle count of 3000 and a media endurance rating of 12000 P/E cycles, then, the processing logic can determine the endurance exhaustion parameter to be $$0.8\left(\text{i.e., } 1 - \frac{3000}{15000}\right)$$

for the high endurance super block and $$0.75\left(\text{i.e., } 1 - \frac{3000}{12000}\right)$$

for the low endurance super block. In another example, if the high endurance super block has a normalized P/E cycle count of 4000, the low endurance super block has a normalized P/E cycle count of 6000, while the average normalized P/E cycle count of the remaining super blocks on the memory device is 5000, the processing logic can determine the endurance exhaustion parameter to be 4/5 for the high endurance super block and 6/5 for the low endurance super block.

In yet another example if the high endurance super block has a media endurance rating of 12000 P/E cycles while the low endurance super block has a media endurance rating of 10000 P/E cycles, then, the processing logic can determine that each P/E cycle on the low endurance super block is equivalent to 1.2 P/E cycles on the low endurance super block in terms of a proportion of the respective maximum endurance of each super block. Furthermore, if, in the same example, the high endurance super block had already experienced 2000 P/E cycles while the low endurance super block had experienced 1000 P/E cycles, the ratio of their respective remaining lifetimes would have changed. Accordingly, the processing logic can calculate the remaining quantity of P/E cycles that each of the super blocks can endure to determine ratio of memory access operations that should be performed on each of the super blocks. In the abovementioned example, the ratio of the respective remaining quantities of PIE cycles that each of the super blocks can endure would become $$\frac{12000-2000}{10000-1000}=\frac{10000}{9000}=\frac{10}{9}.$$

In the same or other embodiments, the processing logic can, at operation 418, distribute operations to each management unit based on the ratio. While distributing the operations to each management unit, the processing logic can, at operation 418, maintain a maximum program-erase count gap between a count of program erase operation cycles performed on the first management unit and the count of program erase operation cycles performed on the second management unit. For example, the maximum program-erase count gap maintained by the processing logic at operation 418 can be defined in terms of a percentage of the count of program-erase operations performed. Similarly, in other embodiments, the processing logic can, at operation 418, maintain a maximum P/E cycle count gap that can be defined in terms of a difference in the count of program-erase operation cycles performed, or in terms of a percentage of a normalized count of program-erase operation cycles performed.

In the various embodiments disclosed herein, the processing logic can receive commands to perform different types of operations (e.g., host-initiated and sub-system-initiated read and write operations) on the memory device. The operations can be write operations that write frequently updated data as well as operations that write seldomly updated data. Thus, in some embodiments, the processing logic can, perform one write operation on a management unit all of whose having blocks reside on a die assigned a high media endurance rating and, can perform another operation on another management unit all of whose having blocks reside on a die assigned a low media endurance rating. Performing the former operation at can include, the processing logic writing data to a high endurance super block on the memory device, and the latter operation can include, the processing logic writing data to a low endurance super block on the memory device. In the embodiments disclosed herein, the processing logic can receive commands to perform different types of operations on the memory device. In some embodiments, the processing logic can perform some operations using high endurance management units and can perform other operations using low endurance management units. In some cases, the processing logic can perform some operations exclusively using high endurance management units and other operations exclusively using low endurance management units. In other cases, the processing logic can perform some operations using both high endurance and low endurance management units (e.g., super blocks). Additional details regarding aspects of the adaptive wear leveling disclosed herein are explained below with reference to FIG. 5.

FIG. 5 is flow diagram of an example method 500 for example method for managing the rating categorization of dies example method for managing the rating categorization of dies in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the MEMC 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In several embodiments described herein, operations of example method 500 can be performed together with or instead of operations of example method 400. In some embodiments, after the processing logic can, at operation 502, identifying multiple groups of super blocks to be programmed, wherein each block within a super block of one group resides on a first die that exhibits a high media endurance rating and each block within a super block of another group resides on a different die that exhibits a low media endurance rating. In the various embodiments, each of the first media endurance rating and the second media endurance rating can indicate a respective number of memory access operations (e.g., program erase operation cycles) that the super block can tolerate before becoming unreliable. In some embodiments, the processing logic can, at operation 506, determine a respective value of a media endurance metric for each super block. For example, at operation 507, the processing logic can determine a respective count (e.g., normalized count) of memory access operations for each super block.

In some embodiments, the processing logic can, at operation 510, determine, for each super block, a respective endurance exhaustion parameter defined by a relationship between the high media endurance rating and the low media endurance rating. In response to determining the endurance exhaustion parameter at operation 514, the processing logic can determine, for each super block, a ratio of a total number of memory access operations to be performed based on the respective endurance exhaustion parameter and the respective value of the media endurance metric. In some cases, the processing logic can use, at operation 510, the normalized values of the media endurance metric to determine the relative endurance exhaustion parameters for each super block and to determine the ratio of operations to perform on each super block. For example, the processing logic can determine that a low endurance super block in a group has a normalized P/E cycle count of 0.2, indicating that the low endurance super block has 80% of remaining media endurance, and that a high endurance super block in the group has a normalized P/E cycle count of 0.4, indicating that the high endurance super block has 60% of remaining media endurance. Accordingly, if all the super blocks in the group have an average normalized P/E cycle count of 0.3, indicating that, on average, all of the super blocks have 70% of remaining media endurance, then the processing logic can determine that the relative endurance exhaustion parameter is 8/7 for the high endurance super block and 6/7 for the low endurance super block. Accordingly, the processing logic can determine, at operation 514, the ratio of the normalized and absolute quantity of memory access operations to be performed on each of the super blocks relative to one or more other super block in the group. In this case, the MEMC can determine that ratio of the normalized quantity of memory access operations (e.g., P/E operation cycles) to be performed on the low endurance super block relative to the average normalized quantity of memory access operations to be performed on each of the super blocks in the group to be 6:7. Similarly, the MEMC can determine, at operation 514, that ratio of the normalized quantity of memory access operations to be performed on the high endurance super block relative to the average normalized quantity of memory access operations to be performed on each of the super blocks in the group to be 8:7. Analogously, the MEMC can also determine that ratio of the normalized quantity of memory access operations to be performed on the low endurance super block relative to the normalized quantity of memory access operations to be performed on the high endurance super block to be 6:8.

In some embodiments, to determine, at operation 514, the ratio of the respective absolute quantities of memory access operations to be performed on each super block, the processing logic can divide each relative endurance exhaustion parameter by the media endurance rating (i.e., measured in units of the media endurance metric) of the super block. For example, if a die assigned a media endurance rating of 12000 P/E cycles, on which the blocks of a particular super block reside, exhibits a normalized P/E cycle count of 0.4, and on average the dies of a group of dies on the memory device exhibit a normalized P/E cycle count of 0.35, then the processing logic can determine that the relative endurance exhaustion parameter for this particular super block is 0.6/0.65 and divide it by 12000 to determine the ratio (i.e., 1/13000) of the absolute quantity of memory access operations (e.g., P/E cycles) to be performed on this particular super block to the total absolute quantity of memory access operations (e.g., P/E cycles) to be performed. In some embodiments, to determine the ratio, at operation 514, of the respective absolute quantities of memory access operations to be performed on each super block, the processing logic can multiply each ratio of the normalized quantities by the ratio of the corresponding media endurance ratings, measured in units of the media endurance metric. For example, if the processing logic determines the ratio of the normalized quantity of memory access operations to be performed on a low endurance super block (e.g., a super block with media endurance metric of 10000 P/E cycles) relative to the normalized quantity of memory access operations to be performed on the high endurance super block (e.g., a super block with media endurance metric of 12000 P/E cycles) to be 6:9, the processing logic can multiply it by 5/6 to determine the ratio (i.e., 8/10) of the absolute quantity of memory access operations (e.g., P/E cycles) to be performed on the low endurance super block to the absolute quantity of memory access operations (e.g., P/E cycles) to be performed on the high endurance super block.

For example, in some embodiments, if the low endurance super block has a media endurance rating of 11000 P/E cycles while the high endurance super block has a media endurance rating of 14000 P/E cycles, then, the processing logic can determine that the endurance exhaustion parameter is 11/14. Additionally, in the same example, if, the high endurance super block had already experienced 3000 P/E cycles while the low endurance super block had experienced 1000 P/E cycles, the ratio of their respective remaining lifetimes would have changed. Accordingly, the processing logic can calculate the remaining quantity of P/E cycles that each of the super blocks can endure to determine ratio of memory access operations that should be performed on each of the super blocks. In the abovementioned example, the ratio of the respective remaining quantities of P/E cycles that each of the super blocks can endure would become $$\frac{11000 - 1000}{14000 - 3000} = \frac{10000}{11000} = \frac{10}{11}.$$

Having determined the ratio at operation 514, the processing logic can, at operation 518, distribute the operations to each super block based on the ratio. As the processing logic distributes, at operation 518, the memory access operations to each super block, the processing logic can, at operation 519, maintain a difference between a count of program erase operation cycles performed on one super block and the count of program erase operation cycles performed on another super block, such that the difference is below a maximum difference (i.e., maintain a maximum program-erase count gap between the respective counts of program erase operation cycles performed on each of two super blocks. In other words, in some embodiments the processing logic may modify the ratio discussed above by permitting no more than a maximum difference between the respective absolute or normalized endurance metric values for each super block described earlier. In the various embodiments, the maximum difference between the absolute P/E cycle count of the high endurance super block and the absolute P/E cycle count of the low endurance super block can be represented by or defined in terms of (i) a percentage of the absolute P/E cycle count of the high endurance super block, or (ii) a percentage of the absolute P/E cycle count of the low endurance super block. In some cases, the maximum difference between the absolute P/E cycle count of the high endurance super block and the absolute P/E cycle count of the low endurance super block can be defined as an absolute difference between the respective counts of P/E cycles performed on each of the high endurance super block and the low endurance super block. In other embodiments, where the respective values media endurance metric are normalized P/E cycle counts, the maximum difference can be defined as a difference between the normalized P/E cycle count of the high endurance super block and the normalized P/E cycle count of the low endurance super block. In the same or alternative embodiments, the P/E cycle count gap can be represented in terms of a percent difference between the respective normalized counts of P/E cycles performed on each of the first super block and the second super block, and can also be represented in terms of an absolute difference between the respective normalized counts of P/E cycles performed on each of the high endurance super block and the low endurance super block.

In some embodiment, as part of distributing the operations to each super block at operation 518, the processing logic can map, at operation 520, the logical block addresses with data that is modified more frequently to the high endurance super blocks and map logical block addresses (e.g., a logical block address range) with data that is updated less frequently to the low endurance superblocks.

Figure 6:
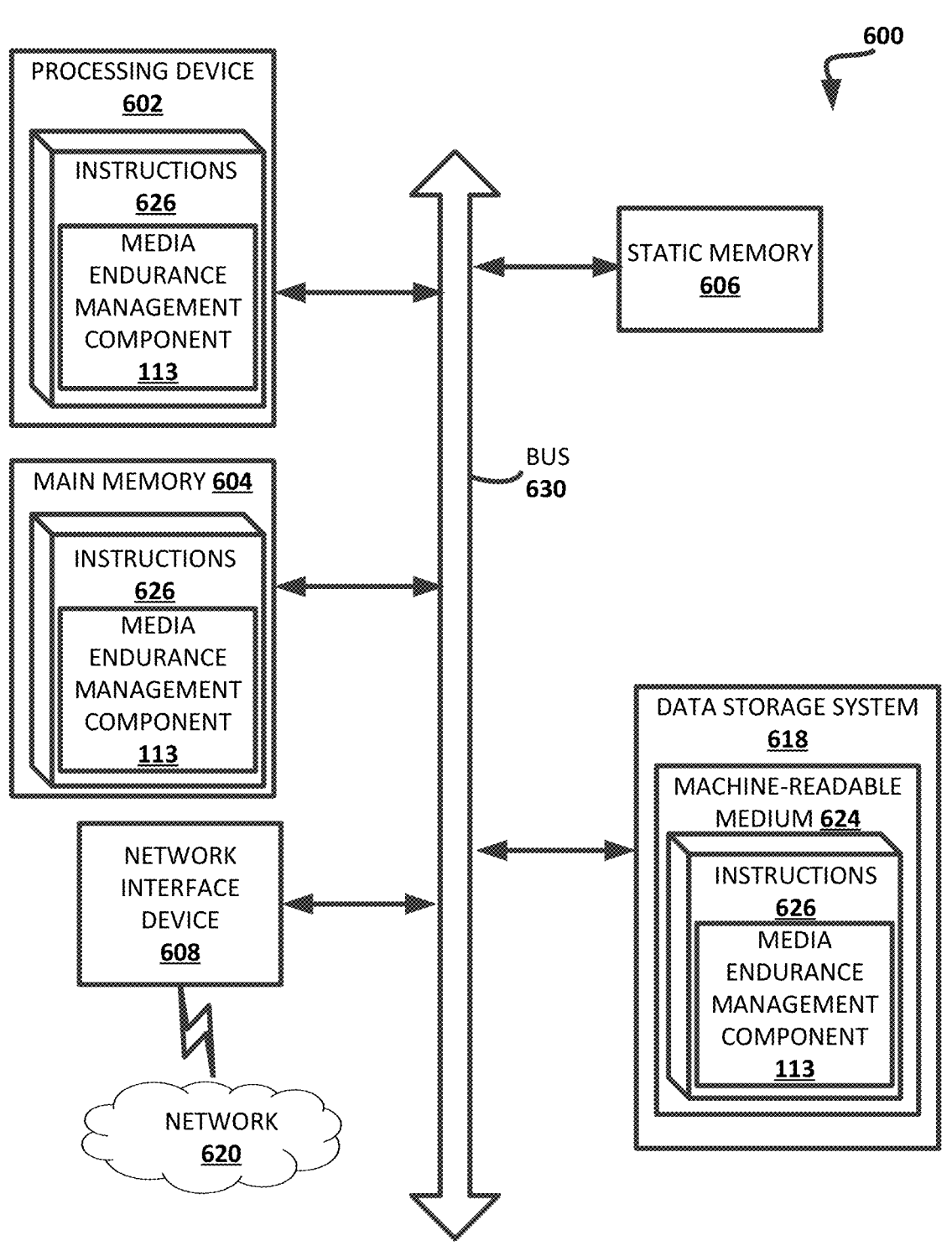
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the MEMC 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a media endurance management component (e.g., the MEMC 113 of FIG. 1 and the methods 400, and 500 of FIGS. 3, 4, and 5 respectively). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device comprising a plurality of dies; and a processing device, operatively coupled with the memory device, to perform operations comprising:

identifying a plurality of management units of the memory device to be programmed, wherein a first management unit comprises a first plurality of memory cells residing on a first die exhibiting a first value of a media endurance metric and a second management unit comprises a second plurality of memory cells residing on a second die exhibiting a second value of the media endurance metric, wherein a respective value of the media endurance metric is associated with a respective data retention capability of a corresponding die, wherein the second value of the media endurance metric is different from the first value of the media endurance metric due to variation during manufacturing;

determining, for each management unit, a respective endurance exhaustion parameter that depends on a ratio between a value of a media endurance metric of a die and a predefined media endurance rating assigned to the management unit during manufacturing, wherein the value of the media endurance metric corresponds to the die on which the plurality of memory cells of the management unit reside, and wherein the predefined media endurance rating depends on an aggregated value of the media endurance metric of two or more dies in the plurality of dies, and wherein the endurance exhaustion parameter indicates remaining lifetime of the management unit; and distributing memory access operations among the plurality of management units based on the respective endurance exhaustion parameters, wherein measurement of error bits of memory cells of the memory device is not relied upon.

2. The system of claim 1, wherein the respective endurance exhaustion parameter for a respective management unit is a normalized value of the media endurance metric of the die on which the plurality of memory cells of the management unit reside.

3. The system of claim 1, wherein the respective endurance exhaustion parameter for a respective management unit is a normalized count of program-erase operation cycles.

4. The system of claim 1, wherein distributing the memory access operations further comprises:

maintaining a difference between a count of program-erase operation cycles performed on the first management unit and the count of program-erase operation cycles performed on the second management unit, such that the difference is below a maximum difference.

5. The system of claim 4, wherein the maximum difference is defined in terms of a percentage of the first value of the media endurance metric or in terms of a percentage of the second value of the media endurance metric.

6. The system of claim 4, wherein the maximum difference is defined as a difference in the counts of program-erase operation cycles performed.

7. The system of claim 4, wherein each count of program-erase operation cycles is a normalized count and wherein the maximum difference is defined as a difference of the normalized counts of program-erase operation cycles performed.

8. The system of claim 4, wherein distributing the memory access operations further comprises:

mapping a first logical block address range to the first management unit and mapping a second logical block address range to the second management unit, wherein data in the first logical block address range is modified more frequently than data in the second logical block address range.

9. A method comprising:

identifying a plurality of management units to be programmed on a memory device comprising a plurality of dies, wherein a first management unit comprises a first plurality of memory cells residing on a first die exhibiting a first value of a media endurance metric and a second management unit comprises a second plurality of memory cells residing on a second die exhibiting a second value of the media endurance metric, wherein a respective value of the media endurance metric is associated with a respective data retention capability of a corresponding die, wherein the second value of the media endurance metric is different from the first value of the media endurance metric due to variation during manufacturing;

determining, for each management unit, a respective endurance exhaustion parameter that depends on a ratio between a value of a media endurance metric of a die and a predefined media endurance rating assigned to the management unit during manufacturing, wherein the value of the media endurance metric corresponds to the die on which the plurality of memory cells of the management unit reside, and wherein the predefined media endurance rating depends on an aggregated value of the media endurance metric of two or more dies in the plurality of dies, wherein the endurance exhaustion parameter indicates remaining lifetime of the management unit; and distributing memory access operations among the plurality of management units based on the respective endurance exhaustion parameters, wherein measurement of error bits of memory cells of the memory device is not relied upon.

10. The method of claim 9, wherein the respective endurance exhaustion parameter for a respective management unit is a normalized value of the media endurance metric of the die on which the plurality of memory cells of the management unit reside.

11. The method of claim 9, wherein the respective endurance exhaustion parameter for a respective management unit is a normalized count of program-erase operation cycles.

12. The method of claim 9, wherein distributing the memory access operations further comprises:

maintaining a difference between a count of program-erase operation cycles performed on the first management unit and the count of program-erase operation cycles performed on the second management unit, such that the difference is below a maximum difference.

13. The method of claim 12, wherein the maximum difference is defined in terms of a percentage of the first value of the media endurance metric or in terms of a percentage of the second value of the media endurance metric.

14. The method of claim 12, wherein the maximum difference is defined as a difference in the counts of program-erase operation cycles performed.

15. The method of claim 12, wherein each count of program-erase operation cycles is a normalized count and wherein the maximum difference is defined as a difference of the normalized counts of program-erase operation cycles performed.

16. A non-transitory computer-readable storage medium comprising instructions that, when executed by a processing device, cause the processing device to perform operations comprising:

identifying a plurality of management units of a memory device to be programmed, wherein a first management unit comprises a first plurality of memory cells residing on a first die exhibiting a first value of a media endurance metric and a second management unit comprises a second plurality of memory cells residing on a second die exhibiting a second value of the media endurance metric, wherein the media endurance metric reflects a quantity of memory access operations, and wherein a respective value of the media endurance metric is associated with a respective data retention capability of a corresponding die, wherein the second value of the media endurance metric is different from the first value of the media endurance metric due to variation during manufacturing;

determining a respective count of memory access operations for each management unit;

determining, for each management unit, a respective endurance exhaustion parameter that depends on a ratio between the count of memory access operations of the management unit and a predefined media endurance rating assigned to the management unit during manufacturing, wherein the predefined media endurance rating depends on an aggregated value of the media endurance metric of two or more dies on which the plurality of memory cells of the management unit reside, wherein the endurance exhaustion parameter indicates remaining lifetime of the management unit; and distributing the memory access operations among the plurality of management units based on the respective endurance exhaustion parameters, wherein measurement of error bits of memory cells of the memory device is not relied upon.

17. The non-transitory computer-readable storage medium of claim 16, wherein the respective endurance exhaustion parameter for a respective management unit is a normalized count of memory access operations.

18. The non-transitory computer-readable storage medium of claim 16, wherein distributing the memory access operations further comprises:

maintaining a difference between a count of program-erase operation cycles performed on the first management unit and the count of program-erase operation cycles performed on the second management unit, such that the difference is below a maximum difference.

19. The non-transitory computer-readable storage medium of claim 18, wherein the maximum difference is defined in terms of a percentage of the first value of the media endurance metric or in terms of a percentage of the second value of the media endurance metric.

20. The non-transitory computer-readable storage medium of claim 18, wherein each count of program-erase operation cycles is a normalized count and wherein the maximum difference is defined as a difference of the normalized counts of program-erase operation cycles performed.

* * * * *